United States Patent
Gnanasekaran et al.

(10) Patent No.: US 9,792,808 B2
(45) Date of Patent: Oct. 17, 2017

(54) ALERT SYSTEM WITH ZONING USING WIRELESS PORTABLE DETECTORS AND A CENTRAL STATION

(75) Inventors: Senthilnathan Gnanasekaran, Vellore (IN); B Gnanasekaran, legal representative, Vellore (IN); Arunkumar Kamalakannan, Chennai (IN); Nukala Sateesh Kumar, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 886 days.

(21) Appl. No.: 12/621,713

(22) Filed: Nov. 19, 2009

(65) Prior Publication Data

US 2011/0115623 A1    May 19, 2011

(51) Int. Cl.
| | |
|---|---|
| G02B 1/08 | (2006.01) |
| G08B 25/01 | (2006.01) |
| G08B 21/02 | (2006.01) |
| G08B 27/00 | (2006.01) |
| G08B 25/00 | (2006.01) |
| H04M 1/725 | (2006.01) |

(52) U.S. Cl.
CPC .......... *G08B 25/016* (2013.01); *G08B 21/02* (2013.01); *G08B 25/002* (2013.01);
(Continued)

(58) Field of Classification Search
CPC .... G08B 25/016; G08B 21/02; G08B 27/001; G08B 25/002
(Continued)

(56) References Cited

U.S. PATENT DOCUMENTS

| | | | |
|---|---|---|---|
| 5,400,246 A | * | 3/1995 | Wilson et al. ................... 700/17 |
| 5,959,529 A | * | 9/1999 | Kail, IV ..................... 340/539.12 |

(Continued)

FOREIGN PATENT DOCUMENTS

| | | |
|---|---|---|
| AU | 2010241417 B2 | 10/2015 |
| CA | 2215440 | 3/1999 |

(Continued)

OTHER PUBLICATIONS

European Patent Office Form 2022, Communication pursuant to Rule 114 (2) EPC, dated Jul. 27, 2011.
(Continued)

*Primary Examiner* — Daryl Pope
(74) *Attorney, Agent, or Firm* — Conley Rose, P.C.; Kristin Jordan Harkins (57) ABSTRACT

A system and method of monitoring zones for alarm conditions and automatically alerting individuals in a plurality of zones about the safety of a particular zone is provided. The method includes providing a site map of a predefined area, configuring a plurality of zones in the predefined area, receiving ambient condition data and location data from a plurality of wireless devices located in the predefined area, computing an alarm level for each zone in the plurality of zones based on the received ambient condition data and location data, and transmitting alert notifications to the plurality of wireless devices. The alert notification sent to each wireless device is based on the computed alarm level of the zone in which that wireless device is located relative to the computed alarm level of the other zones in the plurality of zones.

20 Claims, 9 Drawing Sheets

(52) U.S. Cl.
CPC ....... *G08B 27/001* (2013.01); *H04M 1/72536* (2013.01); *H04M 1/72572* (2013.01); *H04M 2250/10* (2013.01); *H04M 2250/12* (2013.01)

(58) Field of Classification Search
USPC ....... 340/539.26, 506, 502, 504, 505, 539.1, 340/539.11, 539.13, 539.22, 539.23
See application file for complete search history.

(56) References Cited

U.S. PATENT DOCUMENTS

| | | | |
|---|---|---|---|
| 6,028,514 | A | 2/2000 | Lemelson et al. |
| 6,031,455 | A * | 2/2000 | Grube et al. ............. 340/539.26 |
| 6,608,559 | B1 * | 8/2003 | Lemelson et al. ....... 340/539.13 |
| 6,624,750 | B1 * | 9/2003 | Marman et al. ............. 340/506 |
| 7,283,045 | B1 | 10/2007 | Manz |
| 2003/0137415 | A1 | 7/2003 | Thomson |
| 2003/0227381 | A1 | 12/2003 | Best, Jr. |
| 2008/0088434 | A1 | 4/2008 | Frieder et al. |

FOREIGN PATENT DOCUMENTS

| | | |
|---|---|---|
| CA | 2 579 823 A1 | 3/2006 |
| CN | 2800403 Y | 7/2006 |
| EP | 2325822 B1 | 7/2012 |
| JP | H05157825 A | 6/1993 |
| TW | 231349 B | 10/1994 |
| TW | 200741595 A | 11/2007 |
| TW | I524310 B | 3/2016 |
| WO | WO 2006/034246 A2 | 3/2006 |

OTHER PUBLICATIONS

Norwegian Patent 327587.
English translation of Norwegian Patent 327587.
Hungarian Intellectual Property Office's Search Report corresponding to Singapore Application No. 201008457-2, mailed Sep. 8, 2011.
Hungarian Intellectual Property Office's Examination Report corresponding to Singapore Application No. 201008457-2, mailed Sep. 8, 2011.
European Search Report corresponding to Application No. EP 10 19 1385, dated Jan. 6, 2011.
English translation of abstract of CN 2800403 Y.
Search Report from First Office Action re corresponding Chinese application No. 201010610831.2, dated Dec. 26, 2013 (English translation).
First Office Action re corresponding Chinese application No. 201010610831.2, dated Jan. 6, 2014.
First Office Action re corresponding Chinese application No. 201010610831.2, dated Jan. 6, 2014 (English translation).
Patent Examination Report No. 1 for Australia Patent Application No. 2010241417, dated Oct. 13, 2014.
Europe Examination Report for Europe Patent Application No. 10191385.3, dated Nov. 17, 2011.
Europe Patent Application No. 10191385.3, Examination Report, dated Feb. 15, 2011, 3 pages.
Europe Patent Application No. 10191385.3, Examination Report, dated Jan. 10, 2012, 5 pages.
Europe Patent Application No. 10191385.3, Intention to Grant, dated Mar. 7, 2012, 4 pages.
Europe Patent Application No. 10191385.3, Decision to Grant, dated Jun. 28, 2012, 2 pages.
Australia Patent Application No,. 2010241417, Notice of Acceptance, dated Jun. 15, 2015, 2 pages.
Canada Patent Application No. 2,721,027, Examination Report, dated Jun. 3, 2016, 5 pages.
Taiwan Patent Application No. 099139770, Office Action, dated Oct. 2, 2014, 5 pages.
Taiwan Patent Application No. 099139770, Office Action, dated May 22, 2015, 7 pages.
Taiwan Patent Application No. 099139770, Notice to Grant, dated Dec. 23, 2015, 3 pages.

* cited by examiner

ALERT SYSTEM WITH ZONING USING WIRELESS PORTABLE DETECTORS AND A CENTRAL STATION

FIELD OF INVENTION

The present invention relates generally to alarm detection and alert notification. More particularly, the present invention relates to systems and methods of monitoring zones for alarm conditions and automatically alerting individuals in a plurality of zones about zone safety.

BACKGROUND

Portable ambient condition detectors are known in the art. For example, gas, smoke, and heat detectors can be worn on or carried by an individual to monitor zones in which the individual is present. The portable detectors can detect when alarm conditions arise in the zones in which the detectors are located.

Many portable ambient condition detectors known in the art are stand-alone devices. When an alarm condition is detected in a zone, the portable detector provides a notification to the individual wearing or carrying the detector. Accordingly, only individuals in a zone where an alarm condition is detected are alerted about the alarm condition.

Portable devices with wireless capabilities are also known in the art, and the location of an individual wearing or carrying a portable device can be tracked using the wireless capabilities of the device. However, currently, there appear to be no systems and methods for notifying an individual about a remote alarm condition via a portable device.

There appear to be no known systems or methods for sending a notification to a portable device that an alarm condition has been detected in a remote monitored zone. Accordingly, there are no systems and methods to automatically notify an individual outside of a monitored zone that an alarm condition has been detected in the monitored zone. Instead, individuals must be manually alerted or notified to avoid the monitored zone when an alarm condition is detected.

There is thus a continuing, ongoing need for systems and methods of monitoring zones for alarm conditions and automatically alerting individuals in a plurality of zones about the safety of a particular zone. Preferably, such systems and methods transmit notification signals to a plurality of portable devices to alert individuals associated with the portable devices that an alarm condition has been detected.

DESCRIPTION OF THE PREFERRED EMBODIMENTS

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments of the present invention include system and methods of monitoring zones for alarm conditions and automatically alerting individuals in a plurality of zones about the safety of a particular zone. Preferably, such systems and methods transmit notification signals to a plurality of portable devices to alert individuals associated with the portable devices that an alarm condition has been detected. For example, based on received ambient and location data, systems and methods in accordance with the present invention can compute and transmit alarm levels (e.g., emergency, warning, information) associated with the portable devices.

In some embodiments of the present invention, a user can configure the zone criticality (e.g., critical, non-critical, safe area) for each of the zones in the plurality. The zone criticality of each zone can aid a user in graphically differentiating between the plurality of zones, and to prioritize actions when multiple active zones are detected.

Systems in accordance with the present invention can include a wireless infrastructure, a central station, and a plurality of wireless devices (fixed or portable/mobile). The wireless infrastructure in accordance with the present invention can include, for example, a plurality of access points.

The central station in accordance with the present invention can include control circuitry, a programmable processor, and configuring/monitoring software, stored on local computer readable medium, as would be understood by those of skill in the art. In some embodiments of the present invention, the central station can include a server, a personal computer, or a personal computer application, such as a software program.

The wireless devices in accordance with the present invention can be fixed or portable/mobile and include sensor, control, and/or wireless circuitry and an ambient condition detector and/or a plurality of sensors or detectors. For example, a wireless device can include a smoke detector, a heat detector, a gas detector, or any combination thereof.

In methods in accordance with the present invention, the central station can configure a predefined area into multiple zones. During configuration of the predefined area, a zone criticality (e.g., critical, non-critical, safe assembly or high, low, medium) can be assigned to each of the zones in the area. The central station can graphically differentiate the multiple zones based on the assigned criticality of each zone.

Each wireless device in the area can periodically send ambient condition data and location data to the central station. The central station can use data received from the wireless devices to compute the alarm level for each zone. Based on the received data, the central station can determine whether a particular zone is an active zone and graphically represent that zone accordingly. Because location data is periodically sent to the central station, the central station can periodically or dynamically compute the alarm level for each zone.

Active zones can be zones in which an alarm condition has been detected and are deemed dangerous. For example, an active zone can be a zone in which smoke has been detected, an elevated level of heat has been detected, or a gas leak has been detected.

Based on the computed alarm level of each zone, a zoning algorithm associated with the central station can determine the type of alert to be sent to a wireless device, depending on where that device is located. The central station can then send alert notifications to the plurality of wireless devices in the area. For example, in embodiments of the present invention, the central station can send a pre-alert notification to a wireless device that is near an active zone. The central station can determine if an individual associated with a particular wireless device is headed in the direction of an active zone and send a pre-alert notification to avoid the active zone.

The central station can also send, for example, information alerts, emergency alerts, or warning alerts to the wireless devices based on the location of the zone with respect to an active zone. For example, an emergency alert can be sent to a wireless device in an active zone, and an information alert can be sent to a wireless device located within a predetermined distance from an active zone. In some embodiments of the present invention, the central station can send an alert notification to an emergency response team if, for example, the central station does not receive confirmation that an emergency notification was received by a wireless device in an active zone.

Systems and methods in accordance with the present invention include a wireless infrastructure with a plurality of access points, a plurality of wireless devices with ambient condition detectors, and a central station. The central station can communicate in a bidirectional manner with each of the wireless devices via the access point infrastructure. That is, each of the plurality of wireless devices can communicate with a nearby access point, which can communicate with the central station.

For example, a wireless device can send ambient condition data and location data to an access point for transmission to the central station. In embodiments of the present invention, the location data can include a received signal strength indication or a GPS-based signal. Based on zoning configurations performed by the central station, the central station can transmit, via the access point infrastructure, appropriate alert notifications to the plurality of wireless devices.

Figure 1:
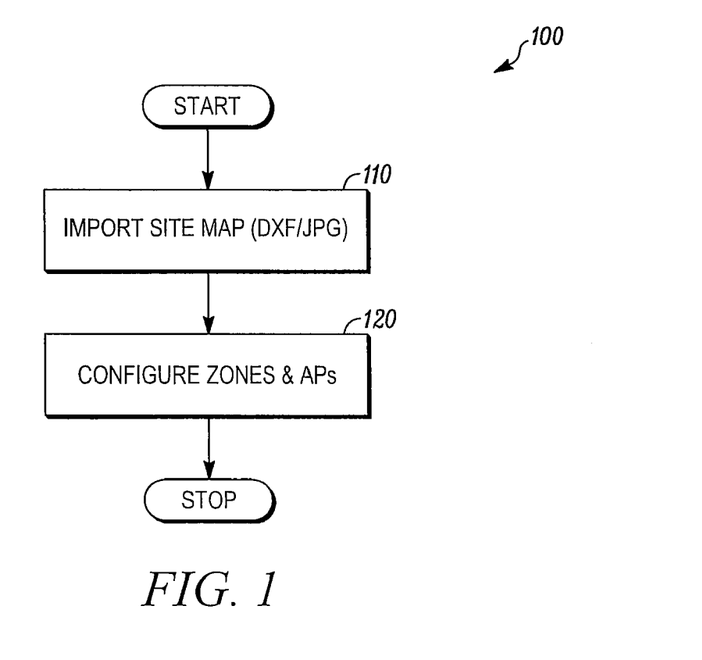
FIG. 1 is a flow diagram of a method of configuring zones on a site/floor map in accordance with the present invention.

FIG. 1 is a flow diagram of an exemplary method 100 of configuring zones on a site map in accordance with the present invention. In the method 100, a site map of a particular region can be imported or loaded onto the central station as in 110. Then the central station can configure a plurality of zones and access points on the site map as in 120. For example, the central station can define a plurality of zones by area on the site/floor map and assign at least one access point to facilitate bidirectional communication between wireless devices in a particular zone and the central station.

When configuring the plurality of zones on the site map as in 120, the central station can also assign an initial criticality of each zone (e.g., critical, non-critical, safe area). For example, the central station can graphically represent each zone based on the criticality of the zones. When an emergency response is required, the criticality of each zone and the corresponding graphical representation thereof can aid an emergency response team in prioritizing actions to be taken.

Figure 2:
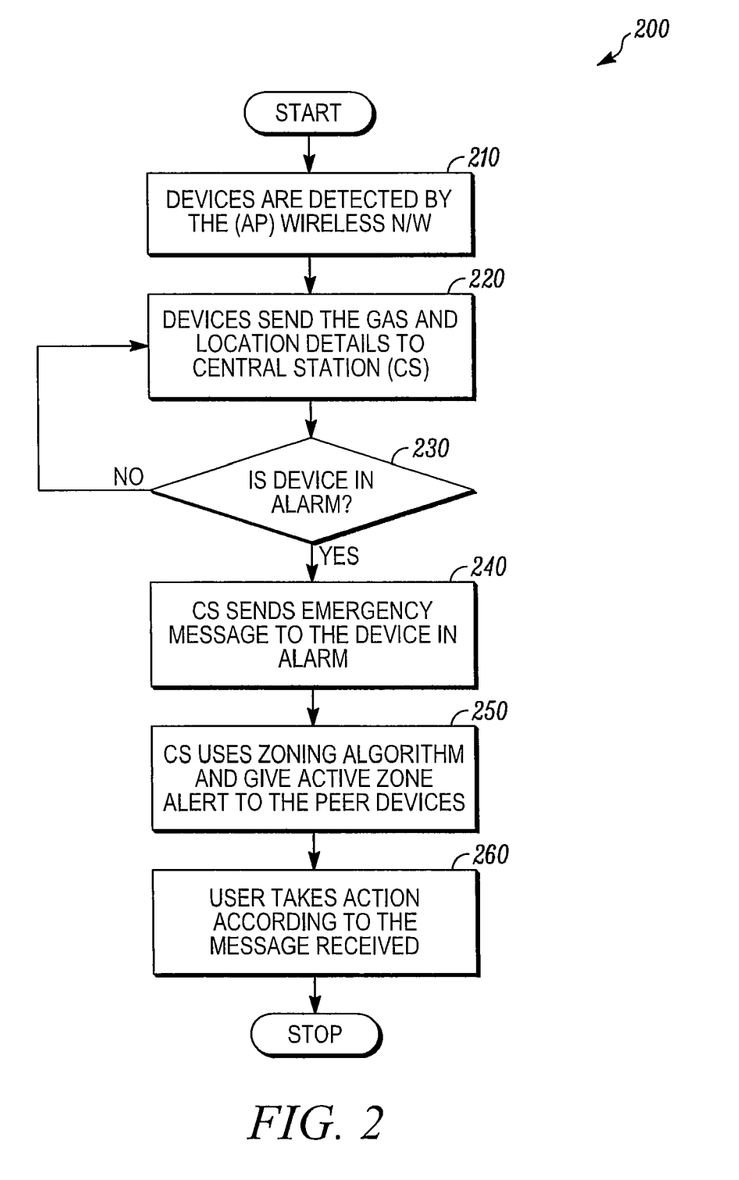
FIG. 2 is a flow diagram of a method of monitoring configured zones for alarm conditions and providing alert notifications to a plurality of wireless devices in accordance with the present invention.

FIG. 2 is a flow diagram of an exemplary method 200 of monitoring configured zones for alarm conditions and providing alert notifications to a plurality of wireless devices in accordance with the present invention. In the method 200, wireless devices in accordance with the present invention can be detected by an access point of a wireless network as in 210. Each of the wireless devices can send ambient condition data and location data to the central station via the associated access point as in 220.

When the central station receives ambient condition and location data from the wireless devices, the central station can use this data to compute an alarm level for each zone and determine whether each zone is an active zone. The central station can determine if a particular device is located in an active zone as in 230. If no devices are located in an active zone, then the central station can continue receiving ambient condition and location data as in 220.

However, if the central station determines that a device is located in an active zone, then the central station can send an emergency notification to the wireless device(s) in the active zone as in 240.

The central station can use a zoning algorithm to determine the position of other wireless devices in the area relative to the active zone as in 250. Based on a device's position relative to the active zone, the central station can send appropriate alert notifications to other wireless devices in the plurality.

For example, a zoning algorithm performed by the central station can determine the type of alert notification to be sent to a particular device. If a particular wireless device is located near an active zone, an emergency notification can be sent to that device. However, if a particular wireless device is located at a predetermined distance away from an active zone, an information notification can be sent to that device.

The zoning algorithm performed by the central station can also determine whether any wireless devices are approaching an active zone. If a particular wireless device is approaching or entering an active zone, the central station can send a pre-alarm notification to that device to avoid entering into the active zone.

In embodiments of the present invention, the alert notifications sent from the central station to a particular wireless device(s) can include the criticality assigned to the zone in which that device is located. Accordingly, an individual associated with a wireless device can be notified about the status of his or her environment. Furthermore, the criticality of a zone can allow the central station to prioritize actions when multiple active zones are detected.

When a particular wireless device receives an alert notification from the central station, an individual associated with that device can take appropriate action based on the received notification as in 260.

Figure 3:
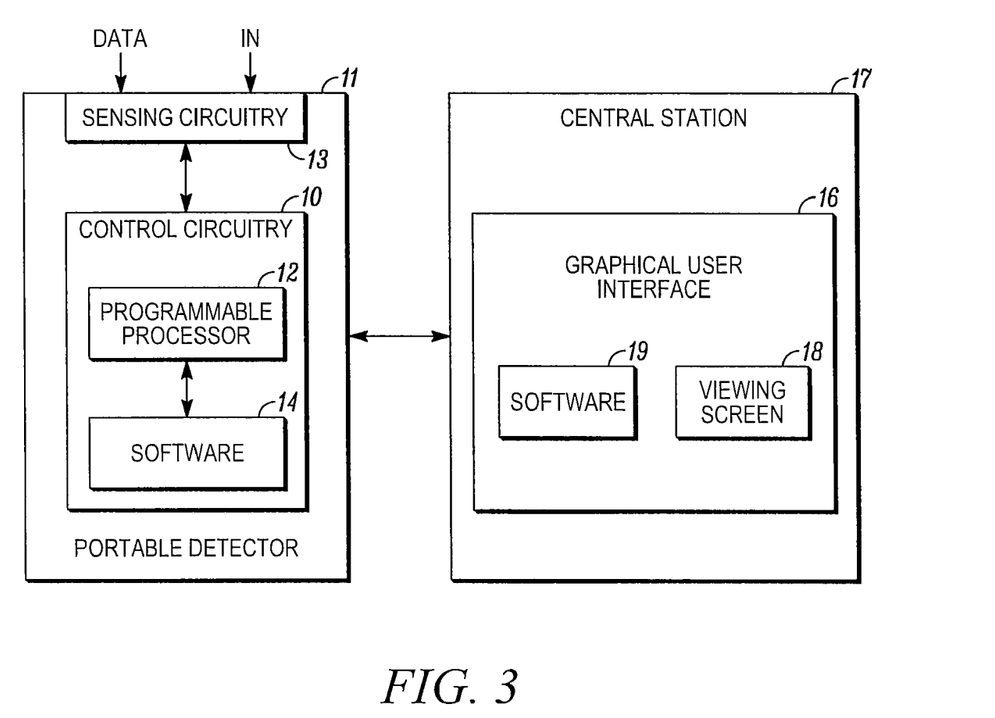
FIG. 3 is a block diagram of a portable detector and central station for carrying out the methods of FIG. 1 and FIG. 2 in accordance with the present invention.

The methods shown in FIG. 1 and FIG. 2 and others in accordance with the present invention can be implemented with the portable detector and central station as seen in FIG. 3. As seen in FIG. 3, a portable detector 11 can include sensing circuitry 13 and control circuitry 10, which can include a programmable processor 12 and software 14, stored on a local computer readable medium, as would be understood by those of ordinary skill in the art. Data received by the portable detector 11 can be input into the sensing circuitry 13 and control circuitry 10.

The central station 17 can be in communication with the portable detector 11 and include a graphical user interface 16. The user interface 16 can include configuring/monitoring software 19 and a viewing screen 18, as would be known by those of skill in the art, for displaying interactive and viewing windows. In embodiments of the present invention, the user interface 16 can be a multi-dimensional graphical user interface.

Figure 4:
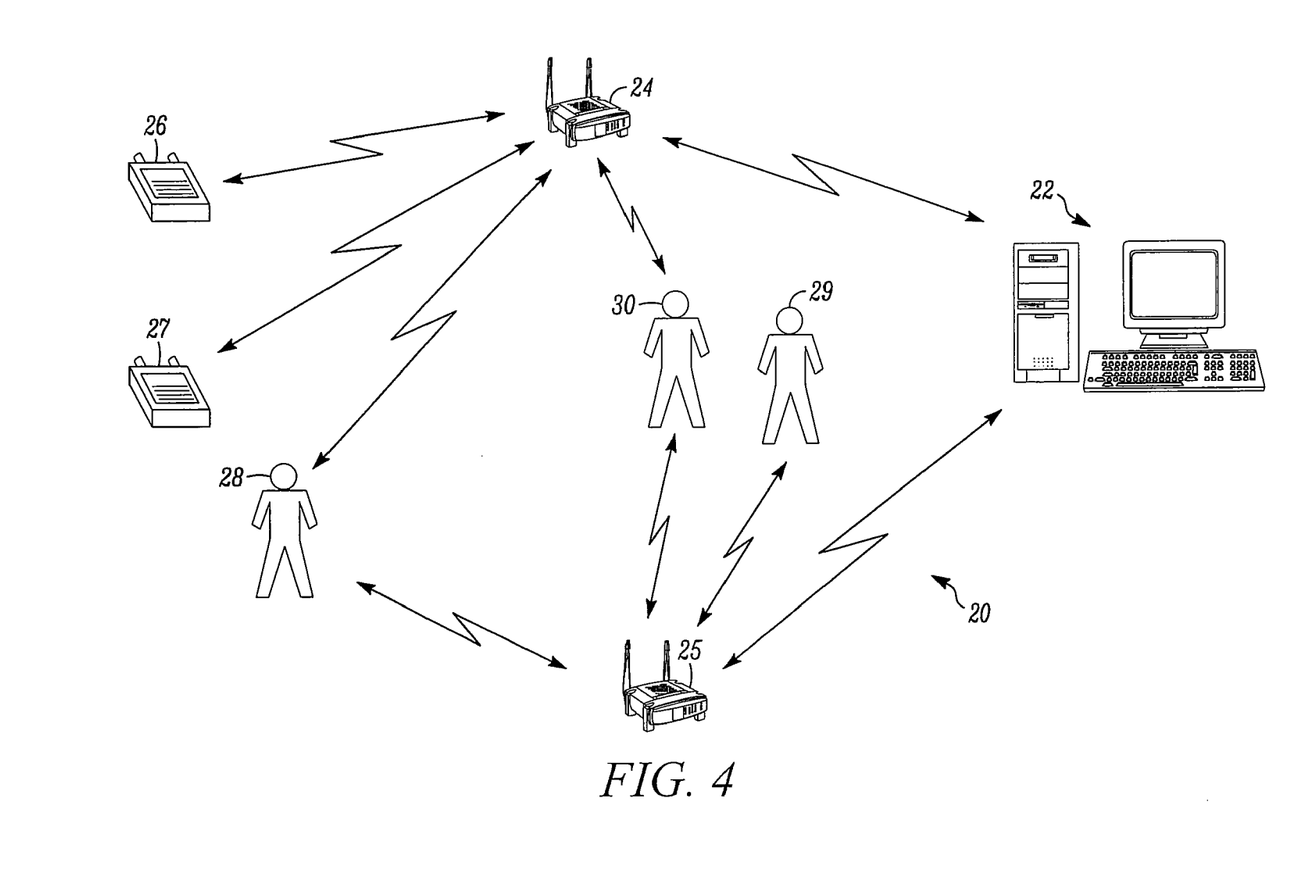
FIG. 4 is a schematic diagram of a system for carrying out the methods of FIG. 1 and FIG. 2 in accordance with the present invention.

FIG. 4 is a schematic diagram of a system 20 for carrying out the methods of FIG. 1 and FIG. 2 in accordance with the present invention. As seen in FIG. 4, the system 20 can include a central station 22, a wireless network with a plurality of access points 24, 25, and a plurality of wireless devices 26, 27, 28, 29, 30. The plurality of wireless devices can include fixed ambient condition detectors 26, 27 and/or portable ambient condition detectors 28, 29, 30 that can be carried by or worn on an individual.

In some embodiments of the present invention, the central station 22 can include a server and/or a personal computer. In some embodiments of the present invention, an access point 24 or 25 can include a router or modem.

As explained above, each wireless device 26, 27, 28, 29, 30 can communicate with a nearby access point 24, 25 and send ambient condition data and location data thereto. The location data can include an indication of received signal strength or a GPS-based signal. The central station 22 can communicate in a bidirectional manner with each of the wireless devices 26, 27, 28, 29, 30 via an access point 24 or 25.

The interactive and viewing windows shown and described herein are exemplary only. Those of skill in the art will understand that the features of the windows shown and described herein may be displayed by additional or alternate windows.

Figure 5:
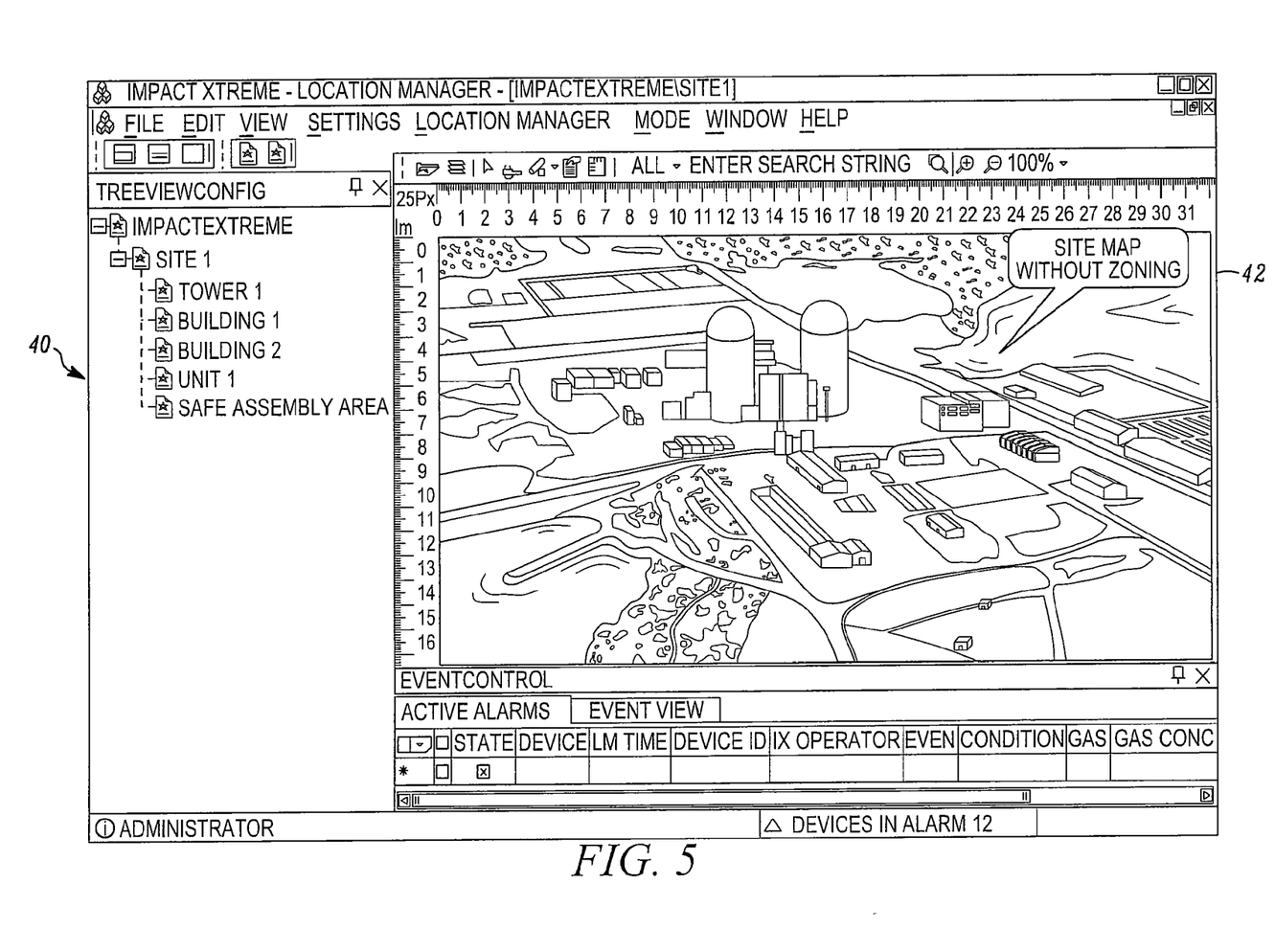
FIG. 5 is an interactive window displayed on a viewing screen of a graphical user interface for displaying a site/floor map in accordance with the present invention.

FIG. 5 is an interactive window displayed on a viewing screen 40 of a graphical user interface for displaying a site map in accordance with the present invention. The viewing screen 40 can include a window 42 to display a site map that is imported to or loaded onto a central station.

When initially imported to or loaded onto the central station, the site map does not include zoning information. Instead, in embodiments of the present invention, the site map can be a picture or graphical representation or a CAD diagram of a particular region.

Figure 6:
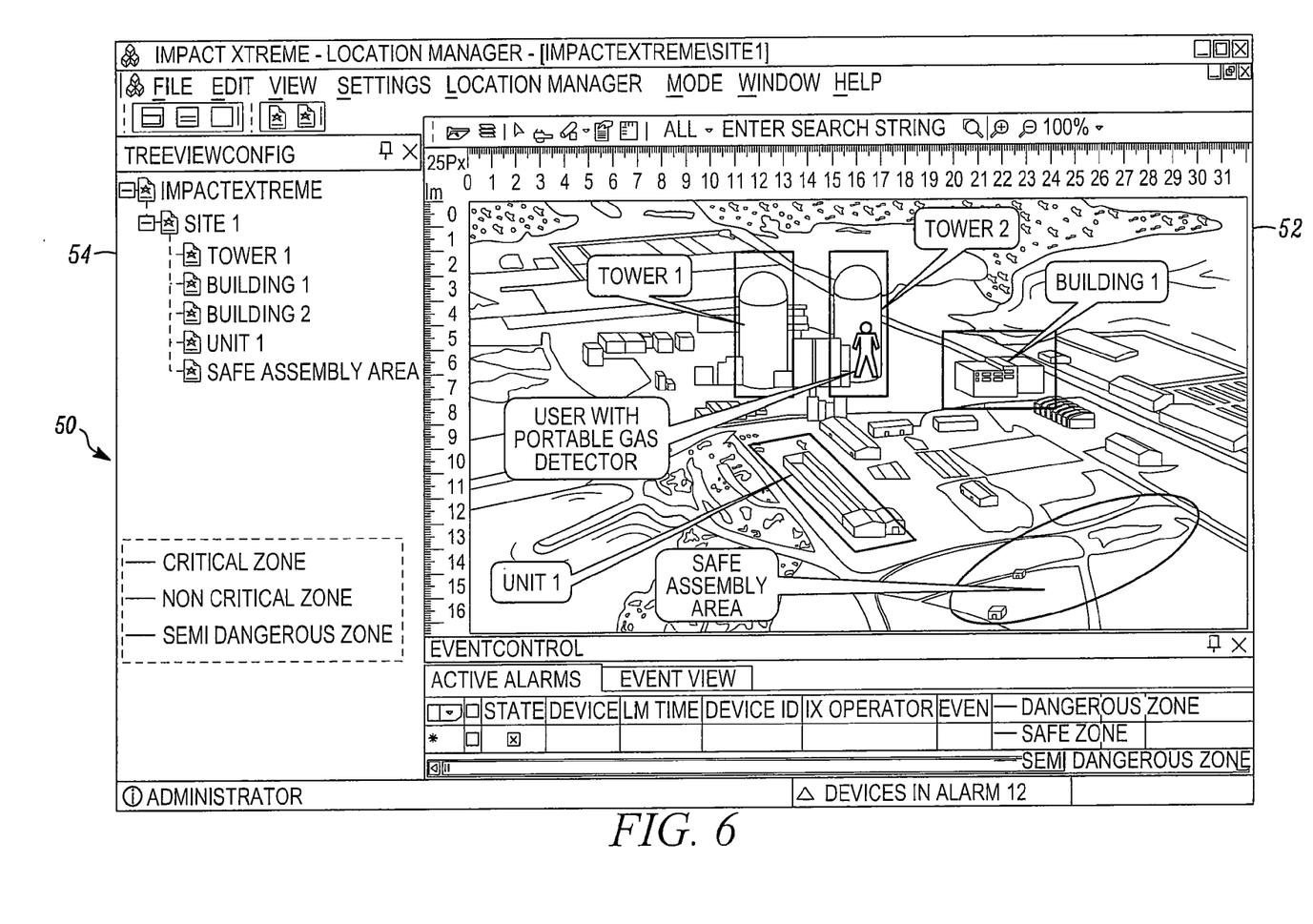
FIG. 6 is an interactive window displayed on a viewing screen of a graphical user interface for displaying configured zones on a site/floor map in accordance with the present invention.

FIG. 6 is an interactive window displayed on a viewing screen 50 of a graphical user interface for displaying configured zones on a site map in accordance with the present invention. The viewing screen 50 can include a window 52 to display a site map with zone configurations therein.

For example, as seen in FIG. 6, the window 52 displays the following configured zones: tower 1, tower 2, building 1, unit 1, and safe assembly area. The viewing screen 50 can also include a window 54 listing the various configured zones on the site map. In embodiments of the present invention, the central station or a user can assign a criticality to each of the configured zones.

Figure 7:
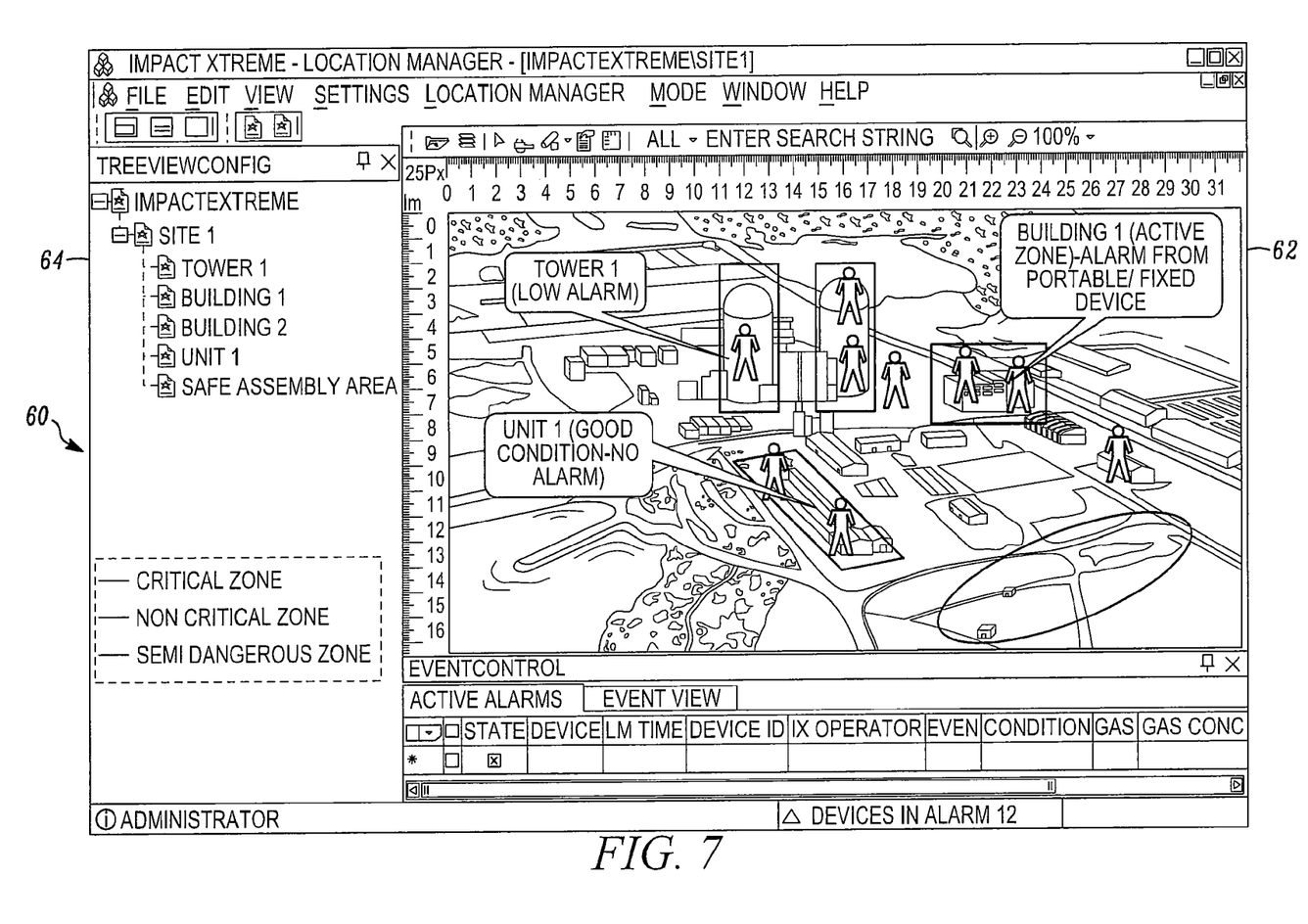
FIG. 7 is an interactive window displayed on a viewing screen of a graphical user interface for displaying the alarm level of configured zones on a site/floor map in accordance with the present invention.

FIG. 7 is an interactive window displayed on a viewing screen 60 of a graphical user interface for displaying the alarm level of configured zones on a site map in accordance with the present invention. In embodiments of the present invention, the alarm level for each configured zone can be based on ambient condition data received from wireless devices in that zone.

For example, as seen in FIG. 7, the alarm level of unit 1 is good condition or no alarm, the alarm level of tower 1 is low alarm, and the alarm level of building 1 is active zone. As explained above, an active zone can be a zone in which an alarm condition has been detected. That is, an active zone can be a zone in which smoke has been detected, an elevated level of heat has been detected, or a gas leak has been detected.

Figure 8:
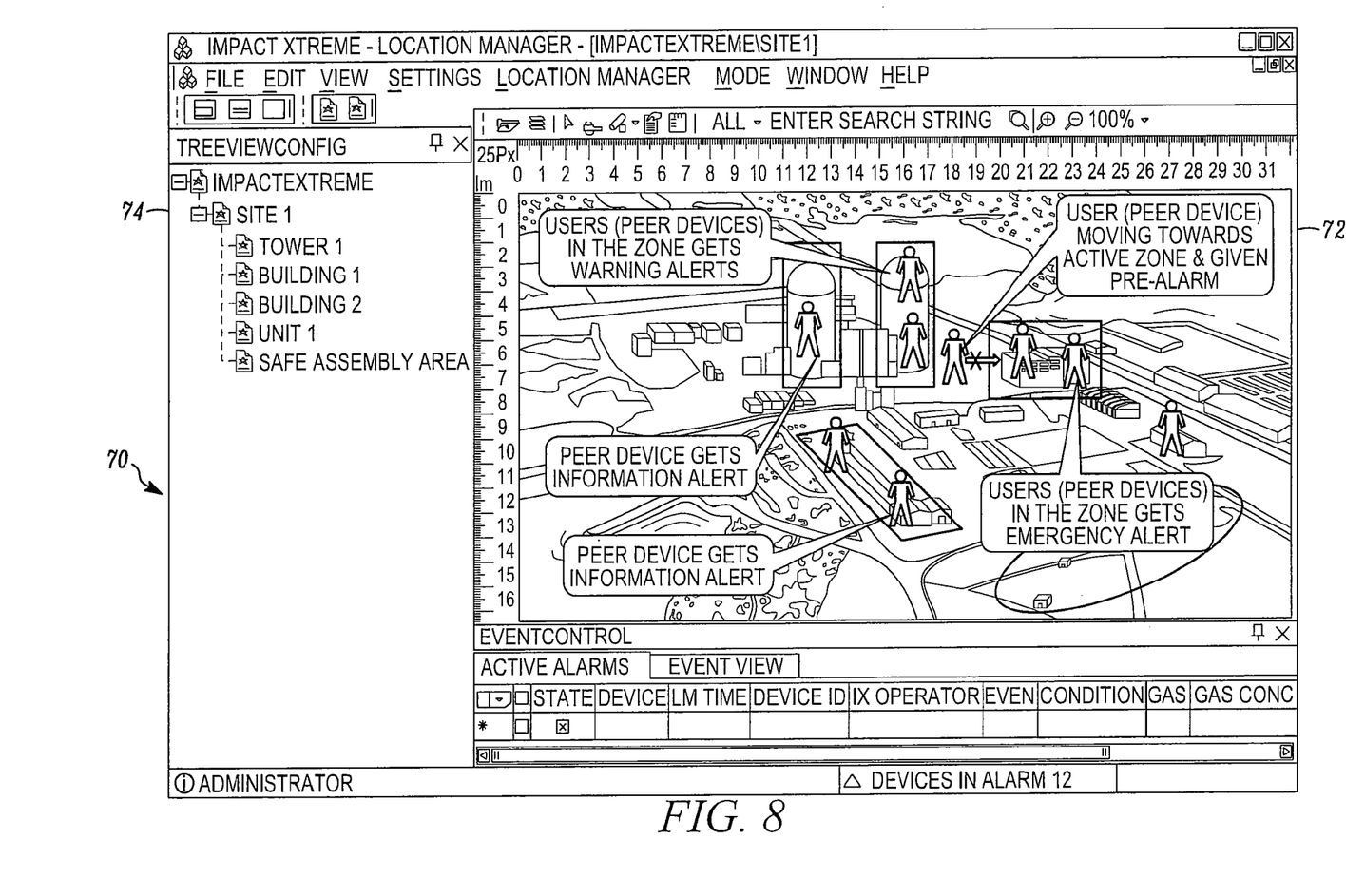
FIG. 8 is an interactive window displayed on a viewing screen of a graphical user interface for displaying notifications sent to devices in configured zones on a site/floor map in accordance with the present invention.

FIG. 8 is an interactive window displayed on a viewing screen 70 of a graphical user interface for displaying the notifications sent to devices in configured zones on a site map in accordance with the present invention. In embodiments of the present invention, the central station can send an alert notification to wireless devices in a particular zone based on the alarm levels determined for the plurality of zones.

For example, wireless devices in the unit 1 and tower 1 zones can receive information alerts. However, since the tower 2 zone is closer to the active zone, wireless devices in the tower 2 zone can receive a warning alert. Wireless devices in the active zone can receive an emergency alert.

Systems and methods in accordance with the present invention can determine when a wireless device is moving based on received location data over a period of time. When a particular wireless device is near or moving towards an active zone, that wireless device can receive a pre-alarm notification, as seen in FIG. 8.

When the central station sends an alert notification to a wireless device, the wireless device can transmit confirmation, via the access point infrastructure, to the central station that the alert notification was received. If the central station does not receive confirmation from a wireless device within a predetermined period of time, the central station can send an emergency notification to an emergency response team (ERT) or others about an alarm condition in an active region.

Figure 9:
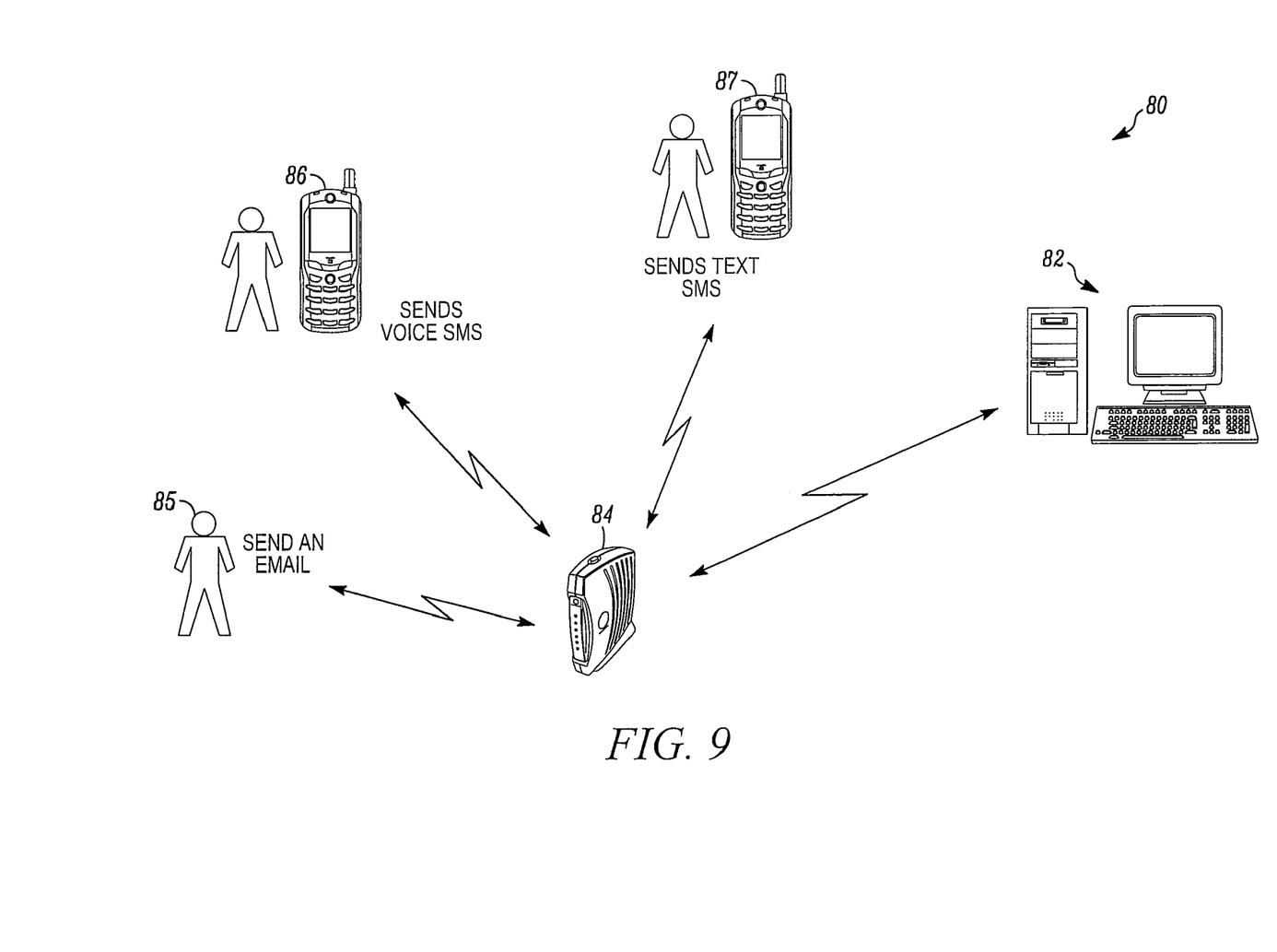
FIG. 9 is schematic diagram of a system for sending emergency messages to a plurality of communication devices in accordance with the present invention.

FIG. 9 is schematic diagram of a system for sending emergency messages to a plurality of individuals in accordance with the present invention. As seen in FIG. 9, the system 80 can include a central station 82, a wireless network with at least one access point 84, and a plurality of communication devices 85, 86, 87.

In some embodiments of the present invention, the central station 82 can include a server or a personal computer, and the at least one access point 84 can include a router or a modem. In some embodiments, the plurality of communication devices can include a personal computer, or a cellular phone.

The central station can send an emergency notification to a plurality of communication devices in an appropriate format for being received by a particular communication device. For example, if the communication device is a personal computer, the emergency notification can be an email. If the communication device is a cellular phone, the emergency notification can be a voicemail or a text message.

From the foregoing, it will be observed that numerous variations and modifications may be effected without departing from the spirit and scope of the invention. It is to be understood that no limitation with respect to the specific system or method illustrated herein is intended or should be inferred. It is, of course, intended to cover by the appended claims all such modifications as fall within the sprit and scope of the claims.

What is claimed is:

1. A method comprising:
   providing a site/floor map of a predefined area of a facility to a central station;
   configuring, by the central station, a plurality of zones in the predefined area of the facility;
   receiving, by the central station, ambient gas condition data and location data from a plurality of wireless gas detector devices located in the predefined area, wherein the plurality of wireless gas detector devices comprises one or more portable gas detector devices, each of which is worn by an individual located within the predefined area;
   computing, by the central station, an alarm level for each zone in the plurality of zones of the facility based on the received ambient gas condition data and location data;
   determining, by the central station, whether each zone of the plurality of zones in the predefined area of the facility is an active zone due to detection of an alarm condition; and
   in response to determination of one or more active zones, tranmitting, by the central station, an alert notification to each of the plurality of wireless gas detector devices within the active zones in the predefined area of the facility, wherein the alert notification sent to each wireless gas detector device includes an indication of relative safety based on the computed alarm level of the zone in which that wireless gas detector device is located relative to the computed alarm level of the other zones in the plurality of zones; and
   determining, by the central station, whether any wireless gas detector device is not within at least one of the active zones but is approaching at least one of the active zones; and
   in response to determination that one or more gas detector device is approaching at least one of the active zone, sending a pre-alert notification to the one or more wireless gas detector devices that is approaching at least one of the active zones.

2. The method of claim 1 wherein providing a site map of a predefined area includes importing or loading the site map for the facility with one or more areas with potential gas leak hazard onto the central station.

3. The method of claim 1. wherein configuring a plurality of zones in the predefined area includes assigning a zone criticality to each zone in the plurality of zones.

4. The method of claim 3 wherein the zone criticality of each zone of the site map of the facility is assigned one of the following: critical, non-critical, or safe area.

5. The method of claim 3 wherein the zone criticality of each zone of the site map of the facility is assigned one of the following levels: high, medium, or low.

6. The method of claim 1 further comprising reassigning the alarm level of each zone based on the received ambient gas condition data and location data from the plurality of wireless gas detector devices.

7. The method of claim 1 further comprising assigning an active zone level to a zone in which ambient gas condition data indicates the presence of an alarm condition.

8. The method of claim 7 wherein transmitting alert notifications includes transmitting an emergency alert to active zones, transmitting a first warning alert to zones within a predetermined distance away from active zones, and transmitting a second warning alert to zones outside of the predetermined distance away from active zones, wherein the first and second warning alerts differ.

9. The method of claim 8 wherein configuring a plurality of zones in the predefined area includes pre-assigning a zone criticality to each zone in the plurality of zones, wherein the central station transmits an emergency notification to an emergency response team about a plurality of active zones, and wherein the emergency response team prioritizes response based on the zone criticality of the pluraUty of active zones.

10. The method of claim 9 wherein the emergency notification from the central station to the emergency response team comprises zone criticality information for each of the active zones.

11. The method of claim 7 further comprising determining whether any wireless gas detector device in the plurality of wireless gas detector devices is approaching the active zone.

12. The method of claim 7 further comprising sending a pre-alert notification to the wireless gas detector device approaching the active zone with instructions to avoid the active zone.

13. The method of claim 12 wherein sending a pre-alert notification to the wireless gas detector device approaching the active zone comprises sending the pre-alert notification to one or more of the wireless gas detector devices which are not located within either one of the active zones or within the predetermined distance from the active zones, but which are moving in a direction towards the active zones.

14. The method of claim 1 further comprising each of the plurality of wireless gas detector devices transmitting a confirmation notification upon receiving an alert notification.

15. The method of claim 14 further comprising transmitting an emergency notification to an emergency response team when no confirmation notification is received from any one or more of the plurality of wireless devices within a predetermined period of time.

16. The method of claim 1 wherein at least some of the wireless gas detector devices are one of fixed, portable, or mobile device.

17. A central station comprising:
   circuitry that configures a plurality of zones in a predefined area of a facility with one or more areas with potential for a gas leak hazard;
   circuitry that receives ambient gas condition data and location data from a plurality of wireless gas detector devices located in the predefined area;
   circuitry that computes an alarm level for each zone in the plurality of zones based on the received ambient gas condition data and location data;
   circuitry that, in response to determination of one or more active zones, transmits an alert notification to each of the plurality of wireless gas detector devices within the active zones in the predefined area of the facility, wherein the alert notification sent to each wireless gas detector device includes an indication of relative safety based on the computed alarm level of the zone in which that wireless gas detector device is located relative to the computed alarm level of the other zones in the plurality of zones; and
   circuitry that in response to determination that one or more gas detector device is approaching at least one of the active zone, sends a pre-alert notification to the one or more wireless gas detector devices that is approaching at least one of the active zones.

18. The central station of claim 17 including a server or a personal computer and including an interactive viewing screen and software stored on a local computer readable medium.

19. The central station of claim 17 further comprising circuitry that communicates with a plurality of access points in communication with the plurality of wireless gas detector devices.

20. The central station of claim 17 further comprising circuitry that recomputes the alarm level of each zone based on the received ambient gas condition data and location data from the plurality of wireless gas detector devices.

* * * * *

UNITED STATES PATENT AND TRADEMARK OFFICE
CERTIFICATE OF CORRECTION

PATENT NO. : 9,792,808 B2
APPLICATION NO. : 12/621713
DATED : October 17, 2017
INVENTOR(S) : Senthilnathan Gnanasekaran et al.

It is certified that error appears in the above-identified patent and that said Letters Patent is hereby corrected as shown below:

In the Claims

Column 7, Line 25: "tranmitting" should be "transmitting"

Column 7, Line 47: delete "." after "1"

Column 8, Line 9: "pluraUty" should be "plurality"

Signed and Sealed this
Twentieth Day of March, 2018

Andrei Iancu
*Director of the United States Patent and Trademark Office*